Patented May 3, 1949

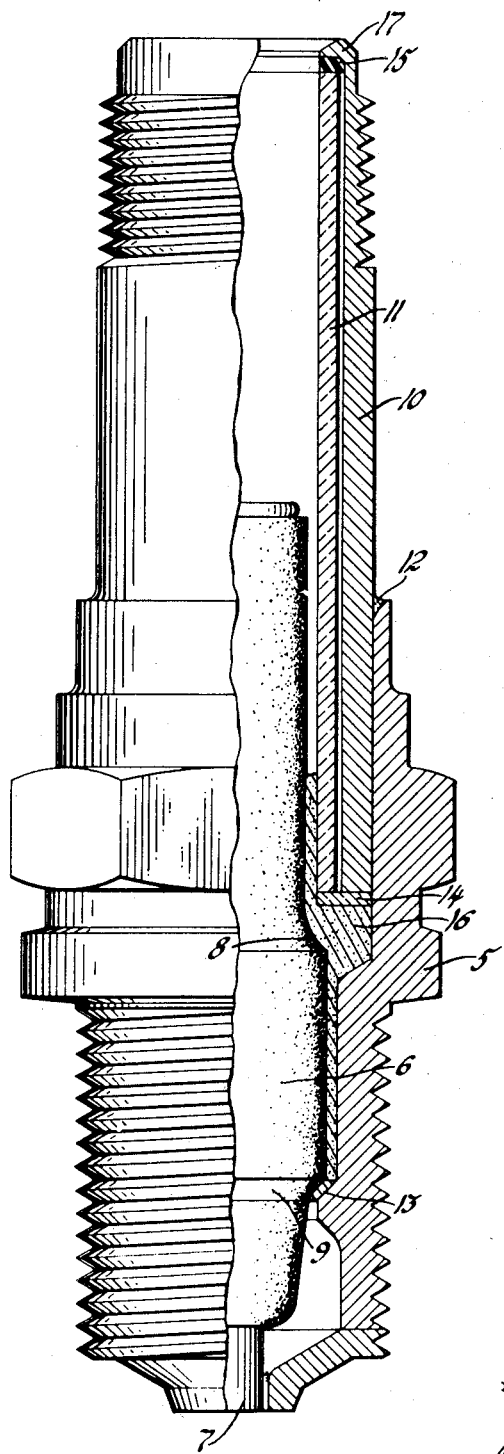

2,469,211

UNITED STATES PATENT OFFICE 2,469,211

SEALING MEANS AND METHOD FOR SPARK PLUGS

Karl Schwartzwalder, Holly, and Carl F. Schaefer, Flint, Mich., assignors to General Motors Corporation, Detroit, Mich., a corporation of Delaware Application August 25, 1944, Serial No. 551,118

7 Claims. (Cl. 123—169)

This invention relates in general to spark plugs and is more particularly concerned with means and methods for securing a strong, gastight and permanent seal between a ceramic body, such as the insulator of a spark plug, and a metal body, such as a shell or casing in which the ceramic body is to be mounted.

The principal object of the invention is to provide an improved seal in which a glass or like vitreous composition is employed as the sealing means. It has been proposed to use for this general purpose vitreous compositions capable when fused at high temperatures of uniting with both the metal and the ceramic body to form a welded joint therebetween.

The complicated procedures necessary in the previously suggested processes and the difficulty of coping with the differences in thermal expansion between the metal and the ceramic insulator have rendered the processes so impracticable that, so far as we are aware, spark plugs in which the insulator is glass-sealed into place in the metal housing have not been marketed on a commercial scale.

We have found, however that, by the use of compositions capable of fusing or becoming plastic at relatively low temperatures and by forcing such compositions when fused or softened into the spaces to be filled under high pressure, a seal may be obtained not only capable of commercial production but having marked superiority in permanence of the sealing properties as compared with current standard products.

The thermo-plastic vitreous composition we have used for sealing is composed chiefly of a glass having an extremely low fusing or flowing temperature, preferably not materially in excess of about 500° C. Glasses of this type are known in the art and we have used successfully, for example, glasses having a high phosphorus or lead content. While not wishing to be restricted thereto, a phosphate glass obtained by melting a mixture of the following ingredients in approximately the percentages indicated has been found very satisfactory:

| | Per cent |
|---|---|
| Potassium carbonate | 11 |
| Sodium carbonate | 18 |
| Aluminum phosphate | 45 |
| Sodium meta-phosphate | 10 |
| Boric acid | 3 |
| Zinc oxide | 9 |
| Lithium carbonate | 4 |

Such mixture will result in a glass having a phosphate content, computed as $P_2O_5$, of approximately 39 per cent. In general, the phosphate content in this type of glass may vary between the approximate limits of 35 to 45 per cent and the $Al_2O_3$ content from 20 to 30 per cent. The zinc and lithium assist materially in lowering the temperature at which the glass becomes readily flowable under pressure and the temperature at which the glass becomes sufficiently plastic for our purpose lies between approximately 400 and 500° C.

Another type of glass having a low fusion point as well as an expansion rate similar to that of iron may be obtained by use of a large content of lead. Such a glass may be prepared by melting a mixture composed approximately as follows:

| | Per cent |
|---|---|
| $SiO_2$, as flint | 45 |
| $K_2O$, as nitrate | 14 |
| $Na_2O$, as nitrate | 6 |
| $CaF_2$, as fluor spar | 5 |
| PbO, as litharge | 30 |

Such glass will become sufficiently plastic to flow under pressure as in our process, at temperatures in the neighborhood of 400° C. In general we prefer to use glass which in the mixture we use will become readily flowable under moderate pressure at temperature above 300° C. and not in excess of 500° C.

In order to prepare a vitreous composition suitable for use as a seal we make an intimate mixture of from 85 to 95 per cent of the low fusing point glass and the remainder largely or entirely mica, both constituents being preferably ground to pass, for example, a 100 mesh screen. The composition may be used as a powder, but if it be desired to form rings or other shapes for convenience in assembly, a small proportion of a plastic or binder may be added. For example, we have used an addition of "Dritex," a hydrogenated cottonseed oil, mixed thoroughly with the powder in the proportion of approximately 2 per cent of the powder. The mica constituent is of major importance and we prefer that the mica amount to about 10 per cent of the mixture. With lesser amounts of mica we find it desirable to add a small percentage of a boric oxide glass, for example, with a mixture of 90 per cent of one of the low-fusing glasses and 5 per cent of finer than 65 mesh mica we may add 5 per cent of a glass containing 95 per cent $B_2O_3$ and 5 per cent $MgO$. This adds to the elasticity of the vitreous mixture which is highly important for a seal under pressure. The mica, apparently because of its lamellar structure, is essential in contributing to the compressibility and sealing properties of the vitreous mixture.

One example of the application of our improved seal is illustrated in the single figure of the accompanying drawing in which is shown a spark plug having a shell member 5 and insulator 6. An electrode 7 is supported in proximity to the lower end of the shell, other specific structure of the interior of the insulator not being illustrated as it is not material to the present invention.

The insulator, which is of ceramic material, is formed with an enlarged central portion between which and the reduced upper and lower ends are provided shoulders 8 and 9, respectively, which shoulders constitute means whereby the insulator may be supported within the shell. A metallic shielding barrel 10 within which is mounted a ceramic sleeve 11 is telescoped into the upper portion of shell 5 and may be secured thereto in any suitable manner, as by a fused metal joint at 12.

Between the lower shoulder 9 and the shell is a gasket 13 which may be of conventional nature, e. g. a yieldable copper gasket. A gasket 14 of any suitable material, as copper, nickel, asbestos, mica, etc., may be located at the lower end of the shield assembly 10, 11. Another gasket 15 of somewhat yieldable character is preferably located between the upper end of the ceramic sleeve 11 and the inturned end 17 of the barrel 10 to protect the ceramic sleeve from fracture.

The seal 16 comprises vitreous material which, as shown, fills the space above the shoulder 8, extends upwardly between the insulator and the ceramic sleeve 11 and extends downwardly between the shell and the enlarged part of the insulator toward or to the gasket 13. Thus the insulator is seated in and surrounded by a vitreous envelope completely filling the space between the shell structure and the insulator throughout a considerable or even major portion of the length of the insulator.

The process of assembling the structure shown is as follows:

The copper gasket 13 and insulator 6 are placed in position in the shell 5. Then a measured amount of the powdered vitreous composition prepared as above described, or, if desired, a molded annulus of the composition is placed in the space above the shoulder 8. The gasket 14 and shielding sleeve parts are then inserted. (Gasket 14 may be omitted if flow of the vitreous composition into the space between parts 10 and 11 is desired.)

The assembly may now be heated by any suitable means, as in a furnace, to a temperature such that the vitreous composition softens, a pressure of, for example, 200 to 250 pounds, being applied to the top of sleeve 10 to hold the parts firmly seated. When the sealing composition becomes sufficiently soft to flow, e. g., at a temperature of approximately 450° C., the pressure is increased and may be as high as 400 to 500 pounds on a spark plug such as is illustrated. The softened material is thereby caused to flow into the spaces to be filled under high pressure and is held under pressure until cooled. Then the sleeve 10 may be silver soldered or otherwise secured to the shell 5.

With the pressures employed the sealing composition is tightly compressed against both the metal and ceramic surfaces although, at the relatively low temperature employed, it does not appear to be fused into either.

Since the seal is effected under high pressure while the parts are heated to a temperature above that to be subsequently encountered in service use of the assembled plug, such service use will not result in loosening, and thereby permitting gas leakage through, the assembly. As a result we have found that seals effected in accordance with the invention have a very high degree of permanence and resistance to leakage.

It will be understood that the specific temperatures and pressures employed may be varied considerably from those given in the above examples, also that glasses having the necessary low fusion or softening temperatures may be varied in composition, those described above being given as examples of satisfactory compositions. We therefore do not wish to be restricted to the specific exemplary disclosures except as required by the claims herein in view of the prior art.

We claim:

1. A spark plug comprising a metallic shell, an insulator of ceramic material within said shell and spaced therefrom and an impervious mass of vitreous material in said space at the sparking end of the plug and completely sealing the insulator in the shell, said vitreous material being solid and inert at temperatures normal to the use of spark plugs but being readily flowable at temperatures not in excess of approximately 500° C. and comprising a fused mixture of a low melting glass and mica in lamellar form.

2. A spark plug comprising a metallic shell, an insulator of ceramic material within said shell and spaced therefrom, an impervious mass of vitreous material in said space at the sparking end of the plug and completely sealing the insulator in the shell, said mass being a mixture of approximately 5 to 15 per cent of mica in lamellar form and 85 to 95 per cent of low-fusing glass, the mixture being solid and inert at temperatures normal to the use of spark plugs but being readily flowable under pressure at temperatures approximately between 400 and 500° C.

3. A process of forming a seal between the metallic shell of a spark plug and a ceramic body within said shell and spaced therefrom comprising assembling the body in the shell, placing in the space therebetween at the firing end of the shell a vitreous mixture of a low melting glass and lamellar mica readily flowable at temperatures not in excess of approximately 500° C., heating the assembly under pressure to soften said mixture while maintaining a relatively high degree of viscosity and finally applying pressure sufficient to force the softened vitreous mixture to flow in all directions into the interstices between the shell and the body and cooling the mixture while maintaining the pressure until the mixture becomes rigid, the mica remaining in lamellar form.

4. A process of forming a gastight seal between a spark plug insulator and a metallic shell therefor comprising assembling the insulator within the shell but spaced therefrom, placing in the space at the firing end of the plug a mixture of glass and lamellar mica readily flowable under superatmospheric pressure when heated to temperatures not in excess of approximately 500° C., heating the mixture under pressure to render it flowable while maintaining a relatively high degree of viscosity, and applying sufficient pressure to force the softened mixture into the spaces between the insulator and shell and maintaining pressure until the mixture becomes rigid, the mica remaining in lamellar form.

5. A spark plug comprising a metallic shell having an internal annular shoulder adjacent its lower end, an insulator of ceramic material including an enlarged portion, supported at its lower end by said shoulder in sealing relation but elsewhere spaced from said shell, and an upper reduced portion, a tubular ceramic shield surrounding said reduced portion but spaced therefrom, and a mass of fused vitreous material in the spaces between said insulator and said shell and between said insulator and said shield and forming a complete seal for said insulator as well as holding said insulator in position in the shell.

6. A spark plug comprising a shell, an insulator in the shell and a seal for the insulator at the sparking end of the plug comprising a fused mixture of low melting glass and lamellar mica, said fused mixture being solid and inert at the working temperatures of the plug, the mica remaining in lamellar form.

7. A spark plug comprising a shell, an insulator in the shell and a seal for the insulator at the sparking end of the plug comprising a fused mixture, approximately 5% to 15% lamellar mica and 85% to 95% low fusing glass, said fused mixture being solid and inert at the working temperatures of the plug, the mica remaining in lamellar form.

KARL SCHWARTZWALDER.
CARL F. SCHAEFER.

REFERENCES CITED

The following references are of record in the file of this patent:

UNITED STATES PATENTS

| Number | Name | Date |
|---|---|---|
| Re. 15,727 | Crossley | Dec. 4, 1923 |
| 1,046,416 | Kraus | Dec. 3, 1912 |
| 1,363,904 | Nicholson | Dec. 28, 1920 |
| 1,974,298 | Case | Sept. 18, 1934 |
| 1,984,313 | Mohrle | Dec. 11, 1934 |
| 2,106,578 | Schwartzwalder | Jan. 25, 1938 |
| 2,258,810 | Rabezzana | Oct. 14, 1941 |
| 2,311,647 | Doran | Feb. 23, 1943 |
| 2,356,053 | Hastings | Aug. 15, 1944 |
| 2,365,219 | Rose | Dec. 19, 1944 |
| 2,391,376 | Monack | Dec. 18, 1945 |

FOREIGN PATENTS

| Number | Country | Date |
|---|---|---|
| 111,198 | Great Britain | 1917 |
| 584,912 | Germany | 1933 |